Nov. 28, 1933.   H. A. TOLAND ET AL   1,937,049
SLICING MACHINE FOR POTATOES AND THE LIKE
Filed Oct. 21, 1929   3 Sheets-Sheet 1

INVENTORS
HERBERT A. TOLAND
BY MAXIMILIAN PAUL JULIE
A. B. Bowman
ATTORNEY

Nov. 28, 1933.  H. A. TOLAND ET AL  1,937,049
SLICING MACHINE FOR POTATOES AND THE LIKE
Filed Oct. 21, 1929  3 Sheets-Sheet 2

INVENTORS
HERBERT A. TOLAND
BY MAXIMILIAN PAUL JULIEN
A. B. Bowman
ATTORNEY

Nov. 28, 1933.  H. A. TOLAND ET AL  1,937,049
SLICING MACHINE FOR POTATOES AND THE LIKE
Filed Oct. 21, 1929   3 Sheets—Sheet 3

INVENTORS
HERBERT A. TOLAND
MAXIMILIAN PAUL JULIEN
BY
A. B. Bowman
ATTORNEY

Patented Nov. 28, 1933

1,937,049

UNITED STATES PATENT OFFICE 1,937,049

SLICING MACHINE FOR POTATOES AND THE LIKE

Herbert A. Toland and Maximilian Paul Julien, Ventura, Calif.; said Julien assignor to said Toland Application October 21, 1929. Serial No. 401,069

7 Claims. (Cl. 146—78)

Our invention relates to slicing machines, and more particularly to machines for slicing fruits and vegetables.

The objects of this invention are: first, to provide a machine of this class which will slice fruits and vegetables rapidly and uniformly, the uniformity of the slices being important when cooking, frying, or otherwise treating the slices, as when making potato chips; second, to provide a machine of this class which will cut slices having corrugations at its opposite sides in which the corrugations are arranged at right angles or other suitable angles relative to each other; third, to provide a machine of this class in which a large number of potatoes, or other articles to be cut, may be placed in a hopper provided therefor and from which the potatoes, or other articles, may be removed singly for conveyance and uniform feeding to the cutting means; fourth, to provide novel conveyer means for removing the potatoes, or other articles, from the hopper and for conveying the same to the cutting machine; fifth, to provide novel knife means for the potatoes or other articles; sixth, to provide novel cam means for actuating the cutters; seventh, to provide novel resilient means for forcing the potatoes, or other articles, into the guide means after the same are relieved from the conveyer; and, eighth, to provide as a whole a novelly constructed machine of this class and one which is relatively simple and economical of construction, durable and which will not readily deteriorate or get out of order.

Figure 2:
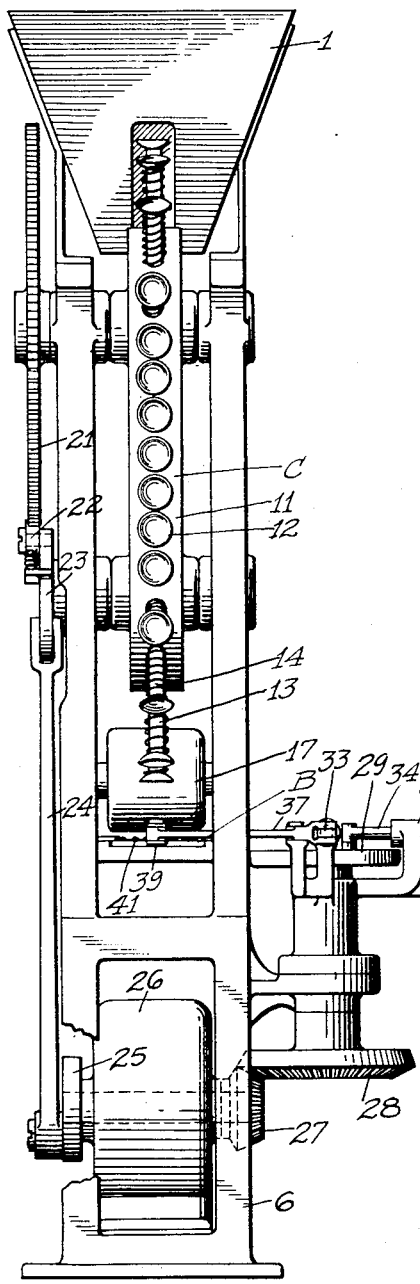
Figure 1:
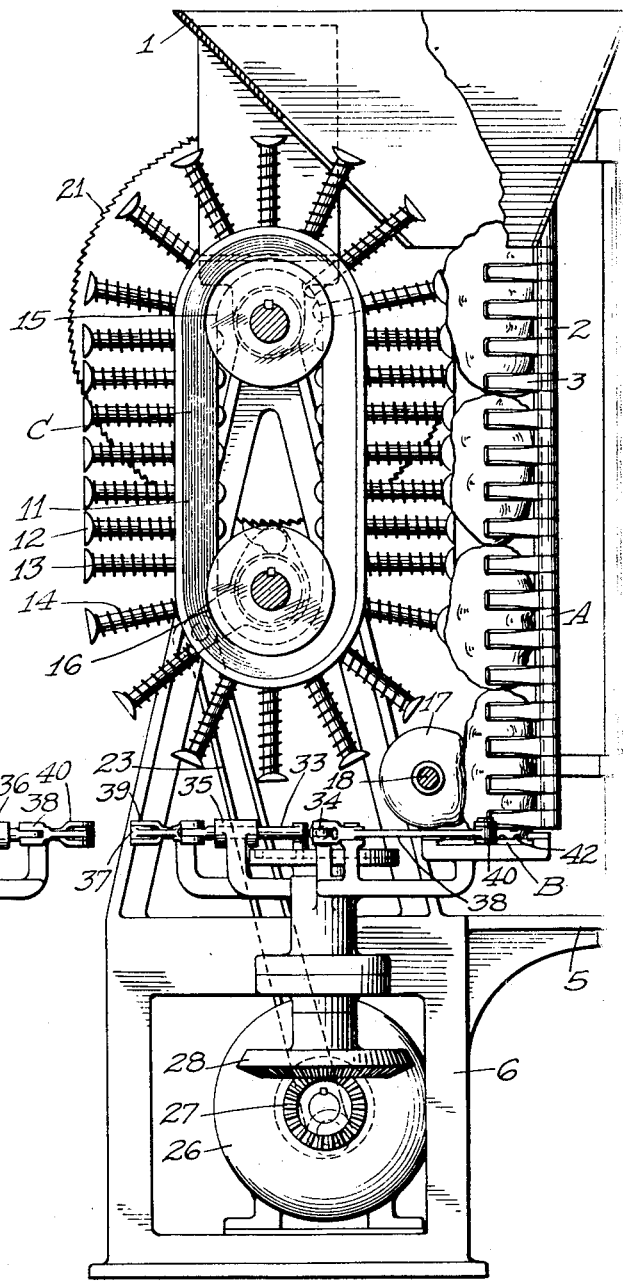
Figure 3:
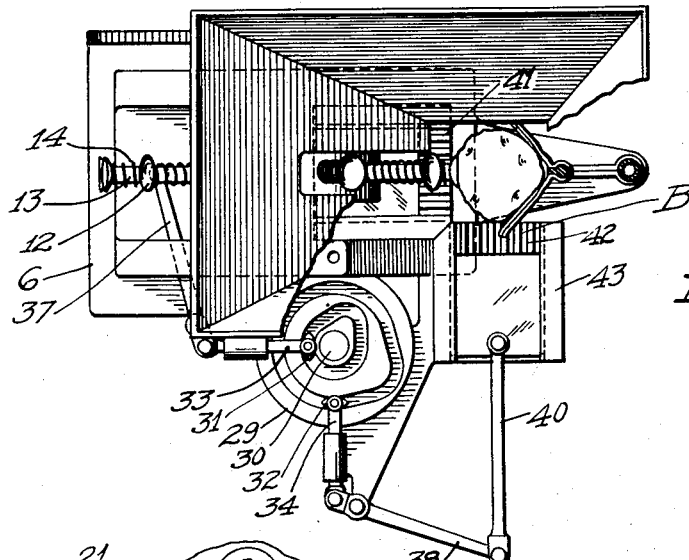
Figure 4:
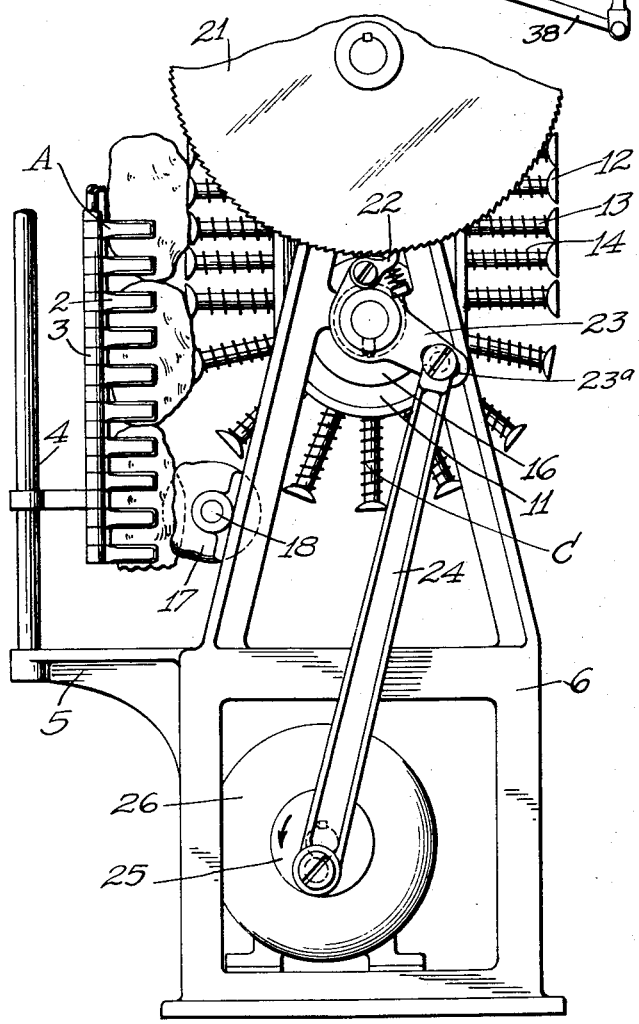
Figure 5:
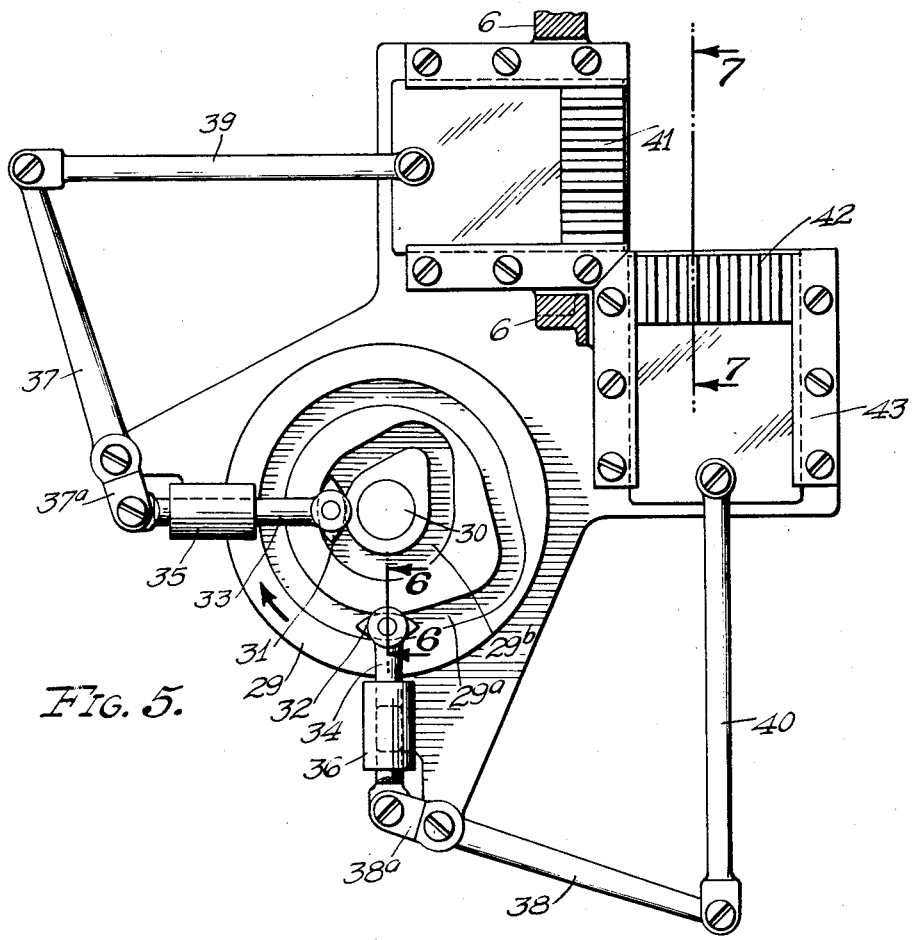
Figure 6:
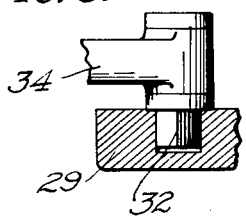
Figure 7:
Figure 8:
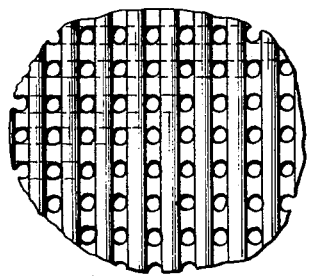

With these and other objects in view, as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of our machine in one form of construction; Fig. 2 is a rear elevational view thereof; Fig. 3 is a fragmentary top view thereof; Fig. 4 is a fragmentary elevational view taken from the opposite side from that of Fig. 1; Fig. 5 is an enlarged top view of the cam means for actuating the cutters; Fig. 6 is a fragmentary sectional view thereof; Fig. 7 is an end elevational view of one of the cutters, and Fig. 8 is a view of a slice severed from the article by the machine.

Like characters of reference refer to similar parts and portions throughout the views of the drawings.

Although our machine is adapted for cutting articles besides potatoes, we shall limit our description to a machine particularly adapted for slicing potatoes for making potato chips.

The potatoes are placed in a suitable hopper 1 placed at the upper end of the machine. From the hopper the potatoes are directed by a guide means A to a cutting means B, the feeding from the hopper to and through the guide means being effected by a conveyer C. The guide means consists of a plurality of resilient V-shaped members 2 which are mounted in vertically spaced apart relation on a rod 3 which prevents the members 2 from rotating. The rod 3 in this instance is supported on a support 4 extending from the hopper 1 to a bracket 5 extending from one side of the frame 6, the support 4 also supporting the hopper 1. The members 2 are preferably made of thin resilient bands which are slightly rounded in cross section so that the potatoes slip readily from one to the other and separate the legs thereof alike or permit the legs to be contracted toward each other.

The conveyer C, in this instance, consists of a thick flexible belt 11 of V-shaped cross section, which belt is provided with a multiplicity of equally spaced vacuum cups carried at the outer ends of reciprocating plungers 13. The plungers 13 extend through the belt 11 and are adapted to be forced beyond the inner sides thereof when force is applied at the outer end of the plungers or against the vacuum cups 12 secured at the outer ends of the plungers. The plungers 13 are normally held in their outermost positions by compression springs 14 placed around the plungers between the vacuum cups and the belt.

The belt 11 is mounted on a pair of sheaves 15 and 16 mounted on horizontal axes spaced vertically from each other and mounted on the upper portion of the frame 6. These sheaves are provided with deep V-shaped grooves into which the belt extends and into which the receding plungers may extend.

The conveyer is operated by a large ratchet 21 which is mounted on the same shaft with the sheave 15. The ratchet may be rotated periodically by a pawl 22 which is carried by one arm of a bellcrank 23 which may be mounted on the same shaft with the sheave 16 but independently thereof. The other arm of the bellcrank 23 may be provided with a slot 23a to which may be adjustably connected a connecting rod 24 which is in this instance reciprocated by a crank disc 25 mounted on the shaft of the motor 26 supported by the frame 6.

When the arms and the cups at the ends of the arms are disengaged from the potatoes near the lower end of the guide means A, the potatoes are engaged by a yieldable and resilient member 17 which is preferably a soft rubber ball or drum which is mounted on an arbor 18. The arbor revolubly mounted on the frame 6 as shown in Figs. 1 and 4. Thus, the potatoes are yieldingly forced against the guide means and held thereagainst while slices are cut from the potato.

On the shaft of the motor 26, we have shown in this instance a bevel gear 27 which meshes with and rotates uniformly a large bevel gear 28 which is of twice the diameter of the gear 27 so that the conveyer will be actuated twice during each revolution of the gear 28 and the cam member 29 connected therewith.

The cam member 29 which is a disc, is positioned at one side of the main portion of the frame, and is mounted at and on the upper end of the shaft 30 which is driven by the bevel gear 28. The cam member 29 is provided with a pair of cam grooves 29a and 29b at its upper side, the greater portion of each groove being circular but having at one side an abrupt outwardly directed portion, as shown in Fig. 5. In the grooves are positioned cam shoes 31 which are attached to the inner ends of reciprocating members 33 which are positioned at right angles to each other and mounted in guides 35 and 36 carried by the frame 6. The outer ends of the reciprocating slides 33 and 34 are pivotally connected to short arms 37a and 38a of levers 37 and 38, respectively, the levers being pivotally mounted intermediate their ends on the frame 6. The opposite ends of the levers 37 and 38 are pivotally connected by connecting rods 39 and 40 to the rear portions of the cutters 41 and 42 which are mounted on the frame 6 in directions at right angles to each other and are retained on the frame 6 by retaining members and knife guides 43. These cutters 41 and 42 are arranged in the same horizontal plane and are so timed that they move outwardly alternately across the path of the potatoes at the lower end of the guide means A. The outwardly directed portions of the cam grooves are so arranged that there is always a slight interval between the end of the inward stroke of one of the cutters and the beginning of the outward stroke of the other cutter so that the conveyer may be moved so as to move the potatoes downwardly one notch, or a predetermined distance, so as to give a certain thickness to the potato chips. As the outer end of the crank rod 24 is adjusted inwardly or outwardly with respect to the arm of the bellcrank 23, the number of notches at which the sprocket is rotated is varied, varying the thickness of the potato chips. It will be noted, however, that the potato chips may be of such thickness that the inward corrugations of the completed potato chips at the opposite sides of the potato chips intersect each other and form transverse openings through the chips, as shown in Fig. 8.

Though we have shown and described a particular construction, combination and arrangement of parts and portions, of our machine, and a particular application thereof, we do not wish to be limited to this particular construction, combination and arrangement, nor to the particular application, but desire to include in the scope of our invention, the construction, combination and arrangement substantially as set forth in the appended claims.

Having thus described our invention, what we claim as new and desire to secure by Letters Patent is:

1. In a machine of the class described, a guide means open at one side, a pair of pulleys at one side of the guide means, a continuous belt conveyer extending around the pulleys and provided at the outer side of the conveyer with a multiplicity of yieldable article holding elements extending into the open side of the guide means, a small yieldable drum positioned at one end of the conveyer adjacent one end and at the open side of the guide means, and cutting means arranged in connection with the guide means at the latter end thereof.

2. In a machine of the class described, a guide means open at one side, a pair of pulleys at one side of the guide means, a continuous belt conveyer extending around the pulleys and provided at the outer side of the conveyor with a multiplicity of yieldable article holding elements extending into the open side of the guide means, a small yieldable drum positioned at one end of the conveyer adjacent one end and at the open side of the guide means, and cutting means arranged in connection with the guide means at the latter end thereof, and a hopper at the opposite end of the guide means in which the articles to be conveyed and cut are stored and from which the same are removed by the conveyer.

3. In a machine of the class described, a hopper, a guide means comprising a series of yieldable gripping fingers extending below the hopper and open at one side, a cutting means at the lower end of the guide means, and a conveyer at the open side of the guide means and extending into the hopper for conveying articles therefrom through the guide means to the cutting means and intermittent acting means for advancing said conveyer.

4. In a machine of the class described, a hopper, a guide means extending below the hopper and open at one side, a cutting means at the lower end of the guide means, and a conveyer at the open side of the guide means and extending into the hopper for conveying articles therefrom through the guide means to the cutting means, said guide means comprising a multiplicity of superimposed resilient V-shaped devices adapted to contract against the articles.

5. In a slicing machine, a feed guide means, a feed mechanism disposed opposite said guide means and arranged to continuously and yieldably engage an article disposed between said feed mechanism and said guide means, means for intermittently advancing said feed mechanism towards one end of said guide means, a feed hopper at the opposite end of the guide means, and a cutter reciprocally mounted at the first mentioned end of the feed guide means transversely across said end.

6. In a machine of the class described, a guide means, a conveyer positioned along side the guide means forming one side thereof, said conveyer having resilient means thereon for forcing the articles conveyed into the guide means and towards one end thereof, a feed hopper at the opposite end of the guide means, and a cutter reciprocally mounted at the first mentioned end of the feed guide means transversely across said end.

7. In a machine of the class described, a guide means, a conveyer positioned along side the guide means forming one side thereof, said conveyer having a plurality of resiliently mounted vacuum cups positioned in close relation on the conveyer adapted to engage and hold the articles to be conveyed for directing them into said guide means, and holding them therein while being conveyed towards one end of said guide means, and cutters reciprocally mounted at said one end of said guide means transversely across said end.

HERBERT A. TOLAND.
MAXIMILIAN PAUL JULIEN.